J. C. McMULLIN.
Signal-Lights.

No. 153,591. Patented July 28, 1874.

WITNESSES:

INVENTOR:

BY

ATTORNEYS.

UNITED STATES PATENT OFFICE.

JAMES C. McMULLIN, OF CHICAGO, ILLINOIS.

IMPROVEMENT IN SIGNAL-LIGHTS.

Specification forming part of Letters Patent No. 153,591, dated July 28, 1874; application filed May 23, 1874.

*To all whom it may concern:*

Figure 1:
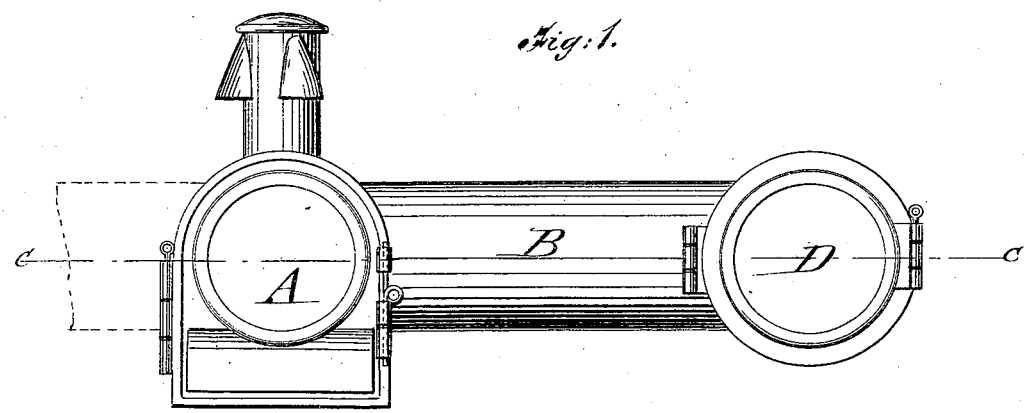
Figure 2:
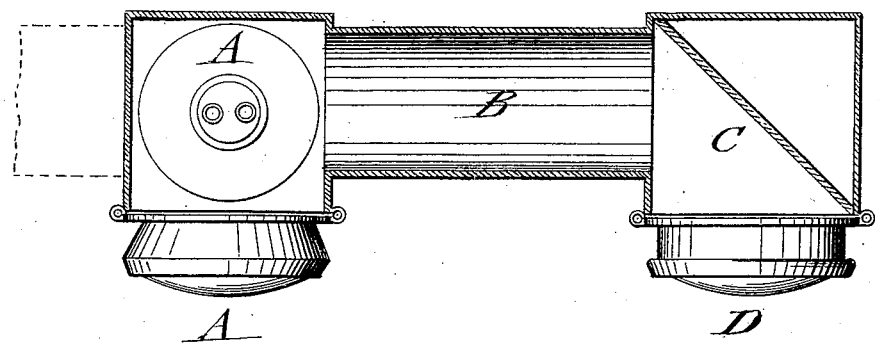

Be it known that I, JAMES C. MCMULLIN, of Chicago, in the county of Cook and State of Illinois, have invented a new and Improved Signal-Lamp, of which the following is a specification:

In the accompanying drawing, Figure 1 represents a front elevation of my improved signal-lamp; and Fig. 2, a horizontal section of the same on the line $c\ c$, Fig. 1.

Similar letters of reference indicate corresponding parts.

The object of my invention is to furnish a signal-lamp for railroad-trains and other purposes, which indicates by the successive appearance of the light thrown through lenses of different colors or sizes from one burner, the distance of the light to be determined by the gradual appearance and relative position of the lights. My invention consists of a signal-lamp which is provided with one or more tubular arms, with reflectors and lenses of different colors at their ends, spread at suitable distance, and lighted by one common burner.

In the drawing, A represents a signal-lamp of a vessel, station, pier, or other suitable structure, or a head-light of a locomotive, which is constructed in the usual approved manner, and provided with one or more tubular arms, B, which extend in horizontal or other direction, and are provided at the distance of one, two, or more feet with a reflector, C, and lens D. The reflector C is preferably placed under an angle of forty-five degrees to the axis of the arms B, so that the whole body of light is thrown forward through the lens as the rays are reflected under the angle of incidence of the light. Lenses of different colors or sizes may be employed, and thereby the distance of the train determined by the successive appearance and position of the lenses.

It has been found by practical tests that in a signal-lamp having red and white eight-inch lenses placed at a distance of thirty-four inches from each other, nothing but the red light is shown at a distance of one and one-fourth miles. At a distance of one mile red is shown with a rim or fringe of white at that side where the white lens is situated. At three-quarters of a mile red and white are both shown distinctly and separately; and at a distance of half a mile a considerable space appears between them, which increases the nearer the light is approached. Any number of lenses can be illuminated from the same burner if placed at the ends of the connecting-arms, so as to economize oil and increase the facility of estimating correctly the distance, the special advantages and applications of which are of great importance for railroads, vessels, harbors, and other purposes.

Having thus described my invention, what I claim as new, and desire to secure by Letters Patent, is—

A signal-lamp consisting of a central lamp, with one or more tubular arms having reflectors and lenses at suitable distance therefrom, to be lighted from one burner, substantially in the manner and for the purpose specified.

JAMES C. McMULLIN.

Witnesses:
J. W. CONGER,
SAML. L. WHIPPLE.